TIMING SYSTEM FOR SETTING CLOCKS TO
DISTORTED STANDARD PULSES

Filed Aug. 23, 1962 5 Sheets-Sheet 1

INVENTORS
Marshall N. Arlin
Morton F. Spears
Richard H. Woodward
BY Roberts, Cushman & Grover,
ATT'YS Nov. 9, 1965 M. N. ARLIN ETAL 3,217,258

TIMING SYSTEM FOR SETTING CLOCKS TO DISTORTED STANDARD PULSES

Filed Aug. 23, 1962 5 Sheets-Sheet 2

United States Patent Office 3,217,258
Patented Nov. 9, 1965

3,217,258

TIMING SYSTEM FOR SETTING CLOCKS TO DISTORTED STANDARD PULSES

Marshall N. Arlin and Morton F. Spears, Westwood, and Richard H. Woodward, Belmont, Mass., assignors, by mesne assignments, to Gorham Corporation, Providence, R.I., a corporation of Rhode Island Filed Aug. 23, 1962, Ser. No. 219,050
9 Claims. (Cl. 325—363)

This invention relates to timing systems, particularly to a method and to correlator apparatus, for detecting, indicating and adjusting the relationship between a locally generated signal such as a sequence of clock impulses, and a received timing signal.

Techniques of the above type have utility in establishing a common time base for two more or less widely separated locations such as ships or aircraft. One method of relating time in various locations to an accepted primary timing standard in another, distant location, is to use a pulsating radio wave timing signal for linking the locations to the standard. In transmitting the linking radio wave both the frequency of the radio carrier wave and the timing of its pulses are preferably derived from the same time standard, typically a very stable electronic oscillator which may in turn be corrected by periodic reference to astronomical observations or to an "atomic" clock. The frequency of the oscillator, if of itself unsuitable, may be multiplied or divided by conventional means to yield the transmitted radio wave frequency. The pulse duration and the pulse interval can then be controlled by actually counting an integral number of cycles of either the primary oscillator or the actually transmitted linking radio wave. The beginning and the end of each pulse are then standard events from which time can be measured. These however are in practice not absolutely ascertainable. One error is introduced by the propagation delay of the radio waves which however is sufficiently well known and understood to permit satisfactory compensation. Another uncertainty stems from the fact that the beginning and the end of the pulses are not sharply defined events because, due to unavoidable practical limitations, the wave pulse, even at the transmitter, takes an appreciable number of cycles to attain full amplitude and to decay fully. The build-up period however is calculable and if any point on the wave pulse can be accurately determined, the time at which the pulse began or any other desired time during its existence can also be accurately determined.

A more troublesome source of inaccuracy, however, in using this technique to relay timing information over great distances has been that, while the transmitted pulsed wave is highly regular, the wave pulses received at a substantial distance are usually so distorted and obscured by random noise that it is impossible to determine the arrival of any part of the wave with a high degree of accuracy. This distortion is a function of distance; the pulses may be received perfect at close distance, but the degradation of the pulses increases with the distance between sending and receiving stations. Any particular pulse of the received wave will be so distorted and obscured by noise that its amplitude at any given instant cannot be expected to be representative of the corresponding amplitude of the pulse at the transmitter.

Objects of the present invention are to provide a system for timing under the control of a transmitted wave pulse standard signal which provides a high degree of timing accuracy at subsidiary distant locations even if this pulse signal is severely distorted; to provide for the accurate timing of one or more clock apparatus at various considerably distanced locations by means of a single pulsed timing wave signal to whose carrier wave the locally generated timing wave is locked, so that the clock accuracy does not depend on the stability of a local oscillator having a finite aging rate; to provide for the accurate and convenient setting of local clocks relatively to the received timing pulse signal regardless of distortion during transmission; to provide for the derivation from a distorted wave pulse of a signal which locates an instant within the pulse to a high degree of accuracy, to which instant can be accurately set another signal, such as local clock signal; to provide a system of this type which does not require pulse amplitude control such as automatic gain control techniques; to provide a timing system which permits manual as well as servo setting of local clocks to distorted standard pulses; to provide a timing system which can be operated effectively and accurately by a simple procedure that can be performed even by very unskilled operators; and to provide such a system which is optimally accurate as well as reliable, and comparatively simple in manufacture and upkeep.

The substance and nature of the invention can be briefly summarized in its principal characteristic aspects for achieving the above and other objects, as envolving the sampling of the forms of complete incoming pulse signal modulated waves at accurately timed different instants occurring within a number of consecutive pulses, and the averaging of the series of samples taken at corresponding instants, whereby comparison of the sets of average sample amplitudes will be accurately representative of the pulse form at a predeterminable time, corresponding to the sampling instant within the pulse duration. In a somewhat more specific aspect, two series amplitude samples are taken at two distinct instants of each pulse, the amplitudes of these samples are averaged over consecutive pulses, the averages are then compared, and a definite instant within each pulse is then determined by way of the ratio of the set of two averaged sample series. In a significant and practically particularly important aspect, one sample series is taken during the full amplitude portion of each of a series of pulses, and another sample series during the rise time of each pulse, preferably but not necessarily, at half amplitude. The first mentioned sample series, taken during the full amplitude pulse portions following the rise portions which supply the other sample series, provides a reference level which is independent of the often varying signal strength. The averaged amplitude of the second sample series is compared with one half of the averaged amplitude of the first sample series. This comparison indicates a single definite instant or position in time within the pulses at which the set of two averaged sample series will be equal. Generally speaking, since this single comparison position is determined by the locations of the sample periods within the pulses and relatively to each other, the shifting of the sampling periods until a given pattern or ratio of the set of averaged amplitudes is obtained, will determine where the samples and hence the beginning of the pulse is. This information can then be used for example for setting a clock, wave generating, or wave adjusting device.

In another important aspect, a local time signal derived from a local oscillator, preferably phased matched with the incoming signal wave, can be set relatively to a definite point of the incoming signal determined by means of the above characterized system for establishing a definite time, or instant, within the distorted form of the received time standard signal.

These and other objects, aspects of novelty and advantageous results of the invention will appear from the following description of its principle and mode of operation and of several practical embodiments illustrating its novel characteristics.

The description refers to drawings in which—

FIGS. 1 and 1*a* are schematical diagrams illustrating the method according to the invention;

Figure 1:
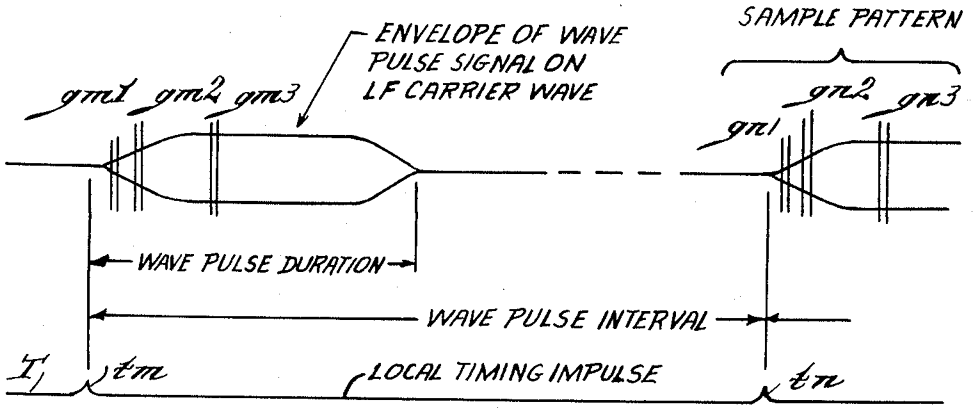

The method of timing according to the invention will first be described with reference to FIGS. 1 and 1*a* wherein P represents a pulsating radio wave timing signal as it is received at a distant local station, for example as a standard to control a clock at that station. FIG. 1 indicates the envelope of a wave pulse train, whereas FIG. 1*a* indicates, for purposes of a specific example, the individual pulse signal waves in considerably distorted fashion. The local clock impuse signal originating from a local oscillator is indicated at T. The herein used terms "wave pulse interval" and "wave pulse duration" are indicated in FIG. 1. The pulse interval is identical, or in integral relation with the intervals defined by the local clock signal.

Several samples are taken from the complete, modulated wave within each pulse duration and each sample is averaged only with those samples of the same series which were taken at corresponding times within other pulses. A set of derived signals is thus obtained which represent the wave form or envelope of the transmitted pulses prior to distortion. An appropriate point or comparison position on the envelope can then be chosen and local time can be determined relative thereto by making suitable corrections for the propagation lag, as will be further explained below.

By providing means for adjusting the time of the various sample takings within each pulse duration, the number of samples necessary to obtain a useful representation of the wave form can be reduced and local time can be determined relative the time of taking of a predetermind one of the samples. In practice, the time of taking of various sample series is adjusted until the derived representative signal set obtained corresponds to a predetermined amplitude pattern or ratio. This pattern is so chosen that at least one representative sample corresponds to a relatively sharply defined event in the transmitted wave form, as for example its half amplitude point. A local clock can then easily be set relative to the comparison position, that is the time within the pulse duration at which this representative sample is taken, if the appropriate corrections relatively to the significant instant, such as the exact beginning of the transmitted wave pulse, are correspondingly predetermined which is altogether feasible.

The samples are of precisely predetermined duration and taken at predetermined instants which are timed within the pulses with sufficient accuracy so that the time of sample taking does not shift relative to the pulse intervals. This can be accomplished in various ways; as mentioned above, a local oscillator can be used which drives a local clock and is phase-locked to the carrier wave of the pulse signal. In the practical example schematically illustrated in FIG. 1*a*, the carrier wave of wave pulse signal P has a frequency of 18 kc., the pulses P*m*, P*n* as well as the timing tickets *tm*, *tn* of T (FIG. 1) occur every second, and the pulse duration is one third of a second. For purposes of explanation, the ticks of the clock impulse signal T are shown as occurring during the beginning of the timing pulse signals, but it will be understood that any desirable time relation between the local clock ticks and the standard signal wave can be introduced, always provided that the sampling begins at exactly the same point of time within each pulse duration.

Figure 1A:
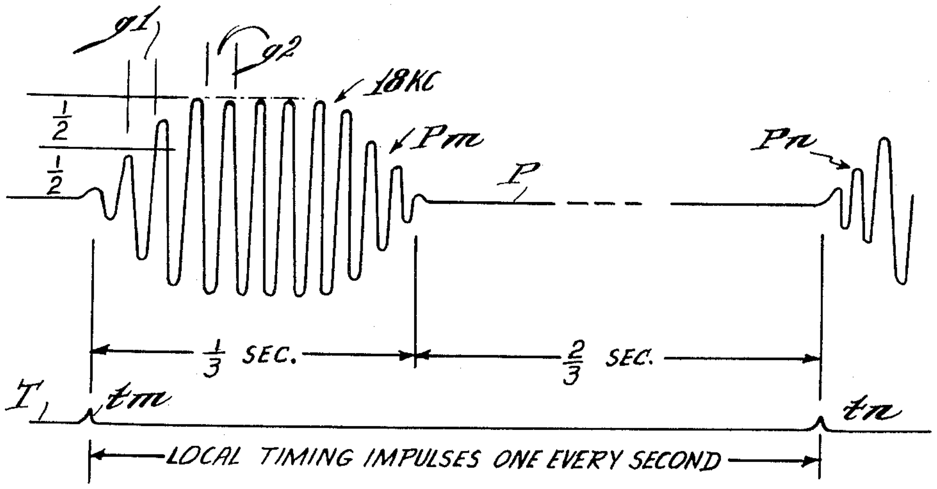

In the preferred embodiment illustrated in FIG. 1*a* only two samples are taken during each pulse interval. One sample, here *g2*, is taken at any convenient time during the full amplitude portion of the pulse and the representative signal so obtained is used as a reference level against which another sample, herein referred to as timing sample, is compared. The time of taking of the timing sample *g1* for each interval is adjusted within the pulse interval until the averaged signal derived from the *g1* samples is one-half the averaged signal derived from the *g2* samples. Local time can then be determined relative the time of taking of the timing sample *g1* which produces this correspondence. As pointed out above, the delay due to the speed of propagation of the wave form is known to a high degree of accuracy so that a local clock can be set, with a correspondingly high degree of accuracy to the primary standard which controls the transmitted pulse wave signal.

Figure 2:
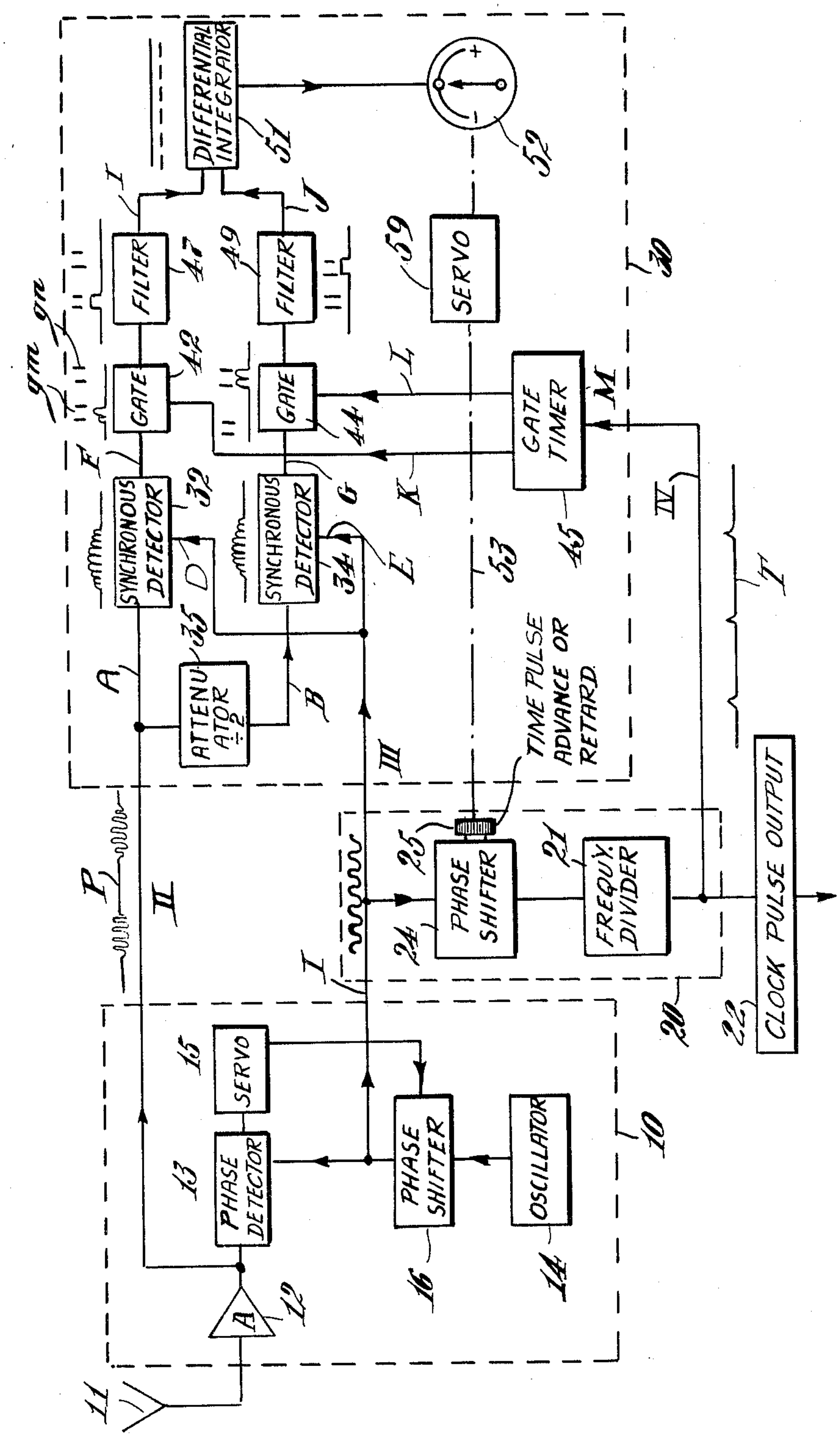
FIG. 2 is a block diagram of a preferred embodiment of apparatus according to the invention.

The above described method steps are also indicated in FIG. 2 by schematical wave form diagrams applied to the respective components of an apparatus embodiment for carrying out the method.

It will now be understood that this specific sampling technique with one sample taken at full pulse amplitude and the other at some fraction (for example but not necessarily one-half) of the full amplitude, eliminates the necessity of measuring the absolute amplitude of the pulse or of controlling it to a known amplitude. This is a very important feature because the maximum pulse amplitudes vary; they may be small between adjacent pulses, but may become significant over a large number of pulses, reaching ratios of more than 1:10 over periods of time such as of the order of magnitude of twelve hours. The ratio of fractional and maximum amplitudes which is utilized according to the invention eliminates the requirement for controlling pulse amplitude.

While the simple relation of two samples such that one of them corresponds to half amplitude is deemed preferable in accordance with one aspect of the invention, other predetermined relations using two or more sample takings can be used such that they correspond in some way to the received wave form whereby, by proper adjustment of the times of sample taking, a comparison position and hence the timing of the transmitted pulses can be accurately deduced. Also, it is not necessary to sample each consecutive pulse; by proper timing arrangement pulses can be skipped and this can be accomplished for example by using in the above described embodiment local timing impulses whose time spacing is a multiple of that of the incoming pulses. Furthermore it is not necessary that samples of all series be taken from each pulse. For example the rise portion timing samples and the full amplitude reference samples can be taken from alternate pulses; generally speaking, the sample taking can be spaced and interlaced along the train of incoming pulses in various ways, so long as the timing and duration of the samples of the several series is accurately controlled so that the corresponding sets of averaged comparison values will define a significant pattern or ratio, as above described. It should be understood that the invention includes such modifications.

A preferred embodiment, with modifications, of apparatus for carrying out the above method, will now be described. It will be understood that other modifications might be usable for the same purpose, within the concept of the method.

Referring to FIG. 2, the preferred embodiment of apparatus for carrying out the method according to the invention may be conveniently divided into three groups of components, a receiver and oscillator section 10, a clock section 20 and a correlator section 30. As mentioned above, systems of this type preferably operate on very low radio frequencies so that the random phase-shifts introduced by changes in the propagation path are very small. In this manner it is possible to maintain an oscillator, at a location remote from the transmitter, phase locked to the carrier wave frequency of the transmitted signal. It is thus possible to provide, at field locations, a frequency standard of an accuracy comparable to that at the radio transmitter even though the independent generation of such a signal would be impossible. This technique is capable of producing a signal of very stable frequency for controlling a correspondingly accurate clock. In this present instance, it may be assumed by way of example, that the incoming signal consists of pulses of one third of a second duration at one second pulse intervals, on an 18 kc. carrier wave.

The signal received by means of the antenna 11 is fed into an amplifier 12. This amplifier is of a type which does not convert or heterodyne the radio frequencies received but, as distinct from conventional superheterodyne receivers, it is adapted to amplify them at the carrier wave frequency while introducing as little phase shift as possible. The output of the amplifier 12 is fed into a phase detector 13 which also receives the output signal of a local oscillator 14, though indirectly through a servo controlled phase shifter. The oscillator 14 generates a signal of the same very low frequency of the incoming pulse carrier wave. The characteristics of the phase detector 13 are such that it produces an output signal which is a function of the phase relationship between the two input signals. This output signal from the phase detector 13 is used to control a servo mechanism 15 to adjust the phase of the output signal of the oscillator 14 being fed into the phase detector 13. This adjustment can be exercised either directly over the oscillator 14 by any convenient conventional means, or it can be applied to the output signal of the oscillator as indicated in FIG. 2 by means of the servo 15 and a phase shifter 16. By means of this feedback control the local signal fed into the phase detector 13 from the phase shifter 16 is accurately phase-locked to and in essence stabilized by the frequency of the transmitted radio wave. The stabilized output of the phase shifter 16 is fed not only into 13 but also at I, into the clock section 20.

Since the output of the phase shifter 16 has the same frequency as the received radio wave, the clock section 20 provides a frequency divider 21 for yielding a pulse signal of a frequency suitable for driving a counter or clock with timing pulses at appropriate intervals for example of one second and decimal fractions thereof. In this embodiment the pulse frequency is one pulse per second which corresponds with the standard pulse wave frequency received at 11. As will be seen, the timing of sample taking can thus be conveniently controlled. Interposed between the oscillator section 10 and the frequency divider 21 is a clock-set phase shifter 24 which, within a certain range, provides a means for adjusting the timing of the pulse output at IV.

The apparatus of the receiver and oscillator section 10 and the clock section 20 is known in the art and therefore does not need to be described in greater detail; such apparatus is for example made and sold by Pickard & Burns, Inc. of Waltham, Massachusetts under the trademark Raloc and is also available from Specific Products Inc. of Woodland Hills, California. The essential requirements to be met by such apparatus for purposes of the present invention are to provide to the correlator section 30 firstly a continuous signal from the phase shifter 16 which is phase-locked to the carrier frequency of the received pulsating wave, and secondly the above-mentioned 1 p.p.s. timing pulse signal which can be time delayed at will at 24 of section 20. In addition, section 10 passes and amplifies the received pulse wave, as indicated at P on line II.

The correlator section 30 is arranged as follows: The received and amplified pulsating wave signal is fed at II, with full amplitude, into one input A of a first synchronous detector 32 and the same wave signal is fed at half amplitude into one input B of a second synchronous detector 34. The synchronous detectors 32, 34 are preferably of a type using switching circuitry of the phase-detector type. The necessary attenuation is accomplished by means of a simple attenuator, such as a resistive divider, indicated at 35. The second input terminals D and E of the detectors 32 and 34 respectively are connected at III to the continuous output of the receiver and oscillator section 10.

As the two input signals to each of the detectors 32 and 34 are already held in fixed phase relation by means of the servo system 15, 16 the corresponding output signals are not operationally influenced by relative phase considerations. The amplitude of the continuous signal available from the local oscillator 14, through line III is constant. Accordingly, the output signals from the detectors 32, 34 are affected operationally only by the amplitude of the received pulse signal. These detectors 32 and 34 are thus utilized as amplitude detectors which are extremely selective as to the carrier frequency of the received pulsating wave. Since this operation depends on the synchronization of the unmodulated wave from III and the pulse modulated wave from II, the devices 32, 34 are herein referred to as synchronous detectors to indicate their selectivity which is particularly valuable for purposes of the invention. The corresponding output signals from the synchronous detectors are unidirectional pulsating signals whose amplitudes at each moment are representative of the corresponding amplitude of the pulse wave signal then being received.

The output signals coming from the detectors 32 and 34 are at F and G fed into corresponding gate circuits 42 and 44 respectively. These gate circuits are controlled through K and L by the gate timer apparatus indicated at 45 and connected to section 20 at IV in such a manner that, when the clock pulse output 22 is properly set and the one impulse per second timing pulses are in proper time relation with the received 1 p.p.s. signal wave, the first gate 42 opens for a short period during the rise time portion of the received pulsating wave and the second gate 44 opens for a similar short period during the full amplitude time portion of the pulsating wave. In this way suitable amplitude samples are taken from each received pulsating wave at two distinct times within the duration of each pulse.

The samples passed by the gates 42 and 44 are filtered, as at 47 and 49 respectively, to remove the remaining pulse wave carrier frequency components and are then fed at I, J, into a voltage difference integrator 51 which is arranged to produce an output signal the amplitude of which is accurately representative of the difference between the integrated or averaged amplitudes of each of the samples taken over a relatively long period, for example, 30 seconds. Preferably the integrator 51 includes some means for determining a variable period of integration, longer periods producing greater accuracy and shorter periods yielding faster readings for rough adjustments of the phase shifter 24 for the purpose now to be described. Integrators of this type, for example the so-called Miller integrator, are well known and easily adapted from differential operational amplifiers now commercially available in packaged form.

The output of the integrator 51 drives a zero-center meter 52, the reading of which is representative of the time or phase relationship then existing between the one impulse per second clock timing signal and the one p.p.s. pulsations of the received carrier wave signal. If the relationship is as predicated for the above explanation of the operation of the gate timer 45, that is if the timing pulses of the clock occur precisely at the half-amplitude points of the received wave pulses, the reading of the meter will be zero indicating that the averaged amplitudes of the two samples are equal—remembering that the full amplitude sample of the signal was halved at the attenuator 35, before detection. If, however, the clock's timing pulses do not occur in precise coincidence with the half-amplitude portion of the received wave pulses, the meter shows a reading which will be in one direction if the clock pulses are too early and will be in the opposite direction if these pulses are too late. The reading can be brought to zero by correcting the timing or phasing of the clock pulses relative to the received wave pulses as, for example, by adjusting the phase shifter 24 in the clock section 20. The clock's timing pulses are then the events from which time is determined locally, in synchronism with the standard timing source which controls the timing of the transmitted waves, appropriate corrections being made as needed for propagation delays.

Since in the above embodiment the correlator 30 is used with a timing pulse the frequency of which is determined by the frequency of the reference pulsed wave radio signal, the phasing of the clock's timing pulses, once properly set, will not have to be changed. Accordingly, manual control over the clock-setting time pulse advance or retard device, herein referred to as phase shifter 24, is contemplated, as indicated in FIG. 2, by the dot and dash line 53 connecting the meter 52 with the control knob 25 of the phase shifter 24. However, this control can also be exercised by means of conventional servo mechanism, indicated at 59 of FIG. 2, so as to provide dynamic correction of the phasing of the clock's timing pulse output and such an arrangement should be understood to be within the scope of the present invention.

The devices indicated by blocks in FIG. 2 are generally speaking of conventional type, with suitable modifications for purposes of the invention. While those skilled in the art will readily appreciate the form of apparatus needed in each case, for a more complete description of a well working embodiment and for a better understanding of the invention, preferred constructions of certain elements, particularly suitable for purposes of the invention are illustrated in FIGS. 3–6.

In these diagrams the correspondence of the various input and output terminals with the connections shown in FIG. 2 is indicated by the use of corresponding alphabetical legends. Appropriate power supply voltages are connected as indicated. The electrical connections of the circuit components are clearly shown in these drawings which are to that extent self-explanatory, while the appropriate structural characteristics, values, ratings or commercially accepted designations for each of the components are given in lists which refer to the numerals of the respective figures. It will be understood that the specific values and ratings given are subject to adjustments applied upon initial and performance testing, according to routine practice in the manufacture of devices of this type. It will be further understood that the values as well as types of the various components are those of practical embodiments so that deviations therefrom are to be expected for other embodiments still within the scope of the invention.

Figures 3, 4:
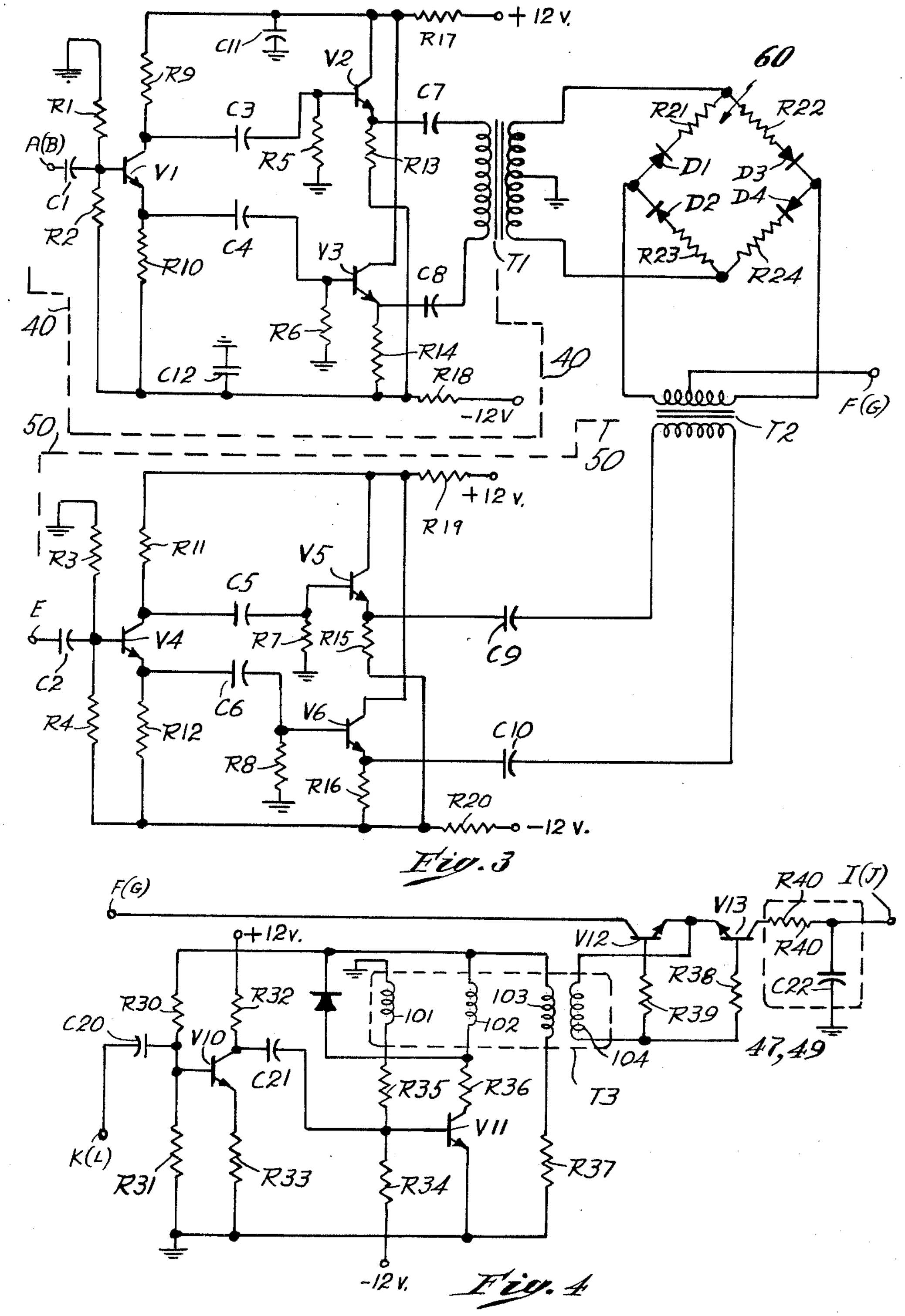
FIG. 3 is a circuit diagram of the phase detector component of FIG. 2.
FIG. 4 is a circuit diagram of a gate component of FIG. 2.

FIG. 3 is a schematic diagram of a synchronous detector circuit, appropriate for use at 32 and 34 in FIG. 2 together with suitable driving amplifiers. The following list, together with FIG. 3 furnishes a complete disclosure of these synchronous detector circuits.

| | |
|---|---|
| C1–C6 | 0.1 μfd. |
| C7–C10 | 1.0 μfd. |
| C11 | 25 μfd. |
| R1–R8 | 4700 ohms. |
| R9–R12 | 2000 ohms. |
| R13–R16 | 3900 ohms. |
| R17–R20 | 120 ohms. |
| R21–R24 | 100 ohms precision±1%. |
| T1–T2 | Transformer, type "Triad SP–50." |
| V1–V6 | Transistors, type "2N169A." |
| D1–D4 | Diodes, type "1N270." |

The circuits within boxes 40 and 50 of FIG. 3, supplied at A (B) and E with the wave pulse and local continuous wave signals, respectively, are conventional push pull driver amplifiers. The amplifier outputs are fed to transformers T1, T2 which are connected to the diode switching matrix 60 which is of the type commonly used as a phase detector. The output of this matrix at F (G) is, as above described with reference to FIG. 2, a synchronously rectified pulsating signal whose amplitude is within the system described, operationally proportionate to the amplitude of the received wave pulse.

Gate and filter circuits, appropriate for use at 42, 45 and 44, 49 FIG. 2, are shown in FIG. 4. The identification of each of the components is given in the following list:

| | | |
|---|---|---|
| C20 | μfd | 2.0 |
| C21 | μfd | .01 |
| C22 | μfd | 1.0 |
| R30 | ohms | 10,000 |
| R31 | do | 5100 |
| R32 | do | 5100 |
| R33 | do | 100 |
| R34 | do | 56,000 |
| R35 | do | 1000 |
| R36 | do | 22 |
| R37 | do | 10,000 |
| R38–39 | do | 510 |
| R40 | do | 1000 |
| V10–V11 | | 2N169A |
| V12–V13 | | T.I.494 |
| D10 | | 1N270 |

T3—Transformer with four windings 101–104 of #40 E.C. wire on a core, available from Magnetics, Inc. of Butler, Pennsylvania, and designated by them as "#50056–1A." The windings 101, 102, 103 and 104 are of 600, 1200, 1200 and 400 turns respectively.

The gate circuits according to FIG. 4 are in well known manner operative in response to the controlling clock impulses supplied at K (L) to render the transistors V12, V13 conductive for the duration of each impulse, so that a wave signal supplied at F (G) is passed to the filters 47, 48, respectively, only during the duration of each impulse from K (L).

Figure 5:
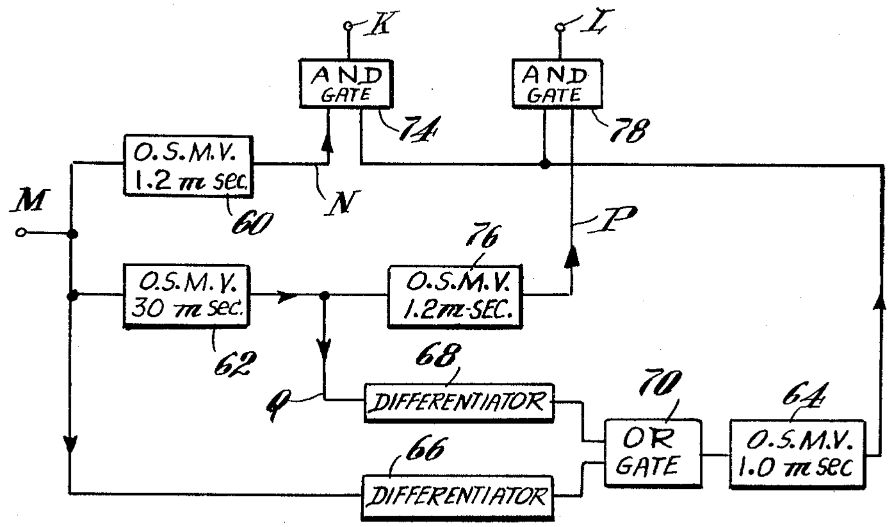
FIG. 5 is a block diagram of a gate timer component of FIG. 2.

A block diagram of the gate timer indicated at 45 of FIG. 2 is shown in FIG. 5 which also illustrates the mode of operation of the timer itself, it being understood that, while the disclosed mode is presently preferred, other possibilities will be readily apparent to those skilled in the art, and that such further modes also fall within the scope of the present invention.

The 1 p.p.s. timing signal T, with ticks $t$ (FIG. 1), available from the clock section 20, triggers immediately three one-shot or monostable multivibrator circuits 60, 62 and 64. Circuits 60 and 62 are connected directly to the clock section 20 through the lead M while the pulse going to the multivibrator 64 passes first through a differentiator or wave shaping circuit 66 and an OR gate 70. The latter circuits however do not delay the operation of the monostable multivibrator 64.

Each of the one-shot multivibrators is of a type which responds to an input pulse by producing an output pulse of duration predetermined by circuit constants and largely independent of the duration of the input pulse. In the present embodiment, the multivibrator 60 produces a pulse of 1.2 milliseconds duration and the circuit 64 produce a pulse of 1.0 millisecond duration. Both of these latter pulses are fed to an AND gate 74 which, in conventional manner, passes a pulse of duration equal to the coextensive duration of the pulses coming from the circuits 60 and 64. As both of these pulses begin at the same time, the pulse passed by the AND gate 74 is of 1.0 millisecond duration as determined by the multivibrator circuit 64. This passed pulse, by operating the gate 40, determines the duration of the sample $g1$ taken during the rise time of the received wave pulse.

The multivibrator circuit 62, which it will be remembered is triggered simultaneously with the multivibrators 60 and 64, is internally arranged to yield an output pulse of 30 milliseconds duration. The length of this pulse times the interval between the two sample takings and is of a duration sufficient to permit the received wave form to reach full amplitude from its half amplitude point. The end of this pulse triggers a fourth monostable or one-shot multivibrator circuit 76 which is internally arranged to produce a pulse of 1.2 milliseconds duration. At this point it should be kept in mind that each of the four multivibrators is of a type which, for reasons which will be apparent to those skilled in the art from the hereinafter presented schematics, responds to the end or positive-going portion of a negative pulse and itself produces a negative pulse. The multivibrator 64 is preceded by suitable pulse shaping circuits 66 and 68 so that its output pulse is not affected by the shape of the triggering pulse.

The end of the 30 millisecond pulse, acting through the differentiator circuit 68 and the OR gate 70, also triggers the multivibrator circuit 64. It should be noted that this is the second triggering of circuit 64 for a single timing pulse at M. The pulses from the multivibrators 76 and 64 are fed into an AND gate 78 which passes a pulse of duration equal to the coextensive durations of the pulses coming from 76 and 64. This passed pulse is therefore of 1.0 millisecond duration as determined by the multivibrator circuit 64 just as was the pulse passed by the AND gate 74 discussed previously. The pulse passed by the AND gate 78 controls the gate 42 and therefore determines the duration of the sample *g*2 taken during the full amplitude portion of the received wave form. It is an advantage of the disclosed system of timing that the duration of both sample takings is determined by the same multivibrator circuit, here 64, since, in determining the half-amplitude point of the received wave form by the method of the invention, it is the relative integrated amplitudes of the averaged sample signals which are of significance rather than their absolute amplitudes.

Although the 1.0 millisecond pulse from the multivibrator 64 is passed to both of the two AND gates 74 and 78 at each triggering of that multivibrator, only one of the main gates 40 and 42 is triggered in each case since only one of the corresponding AND gates, 74 and 78, will receive the necessary 1.2 millisecond pulse at the same time. The circuitry of the blocks whose operation has been described above is quite conventional, with the possible exception of the multivibrator 64, the AND gates 74 and 78, the OR gate 70, and the differentiators 66 and 68 which are illustrated more in detail in FIG. 6. Components suitable for this circuitry are given in the following list:

| | | |
|---|---|---|
| C30–31 | $\mu\mu$fd | 1500 |
| C32 | $\mu$fd | .005 |
| C34 | $\mu$fd | 270 |
| C100 | $\mu$fd | .047 |
| R50–R51 | ohms | 15,000 |
| R52 | do | 22,000 |
| R53–R54 | do | 1800 |
| R55 | do | 8200 |
| R56 | do | 1000 |
| R57 | do | 10,000 |
| R58–R59 | do | 2000 |
| R60–R61 | do | 1000 |
| R62 | do | 56,000 |
| R100 | do | 33,000 |
| D20 | | 1N457 |
| D21–D29 | | 1N270 |
| V20–V21 | | 2N404 |

Figure 6:
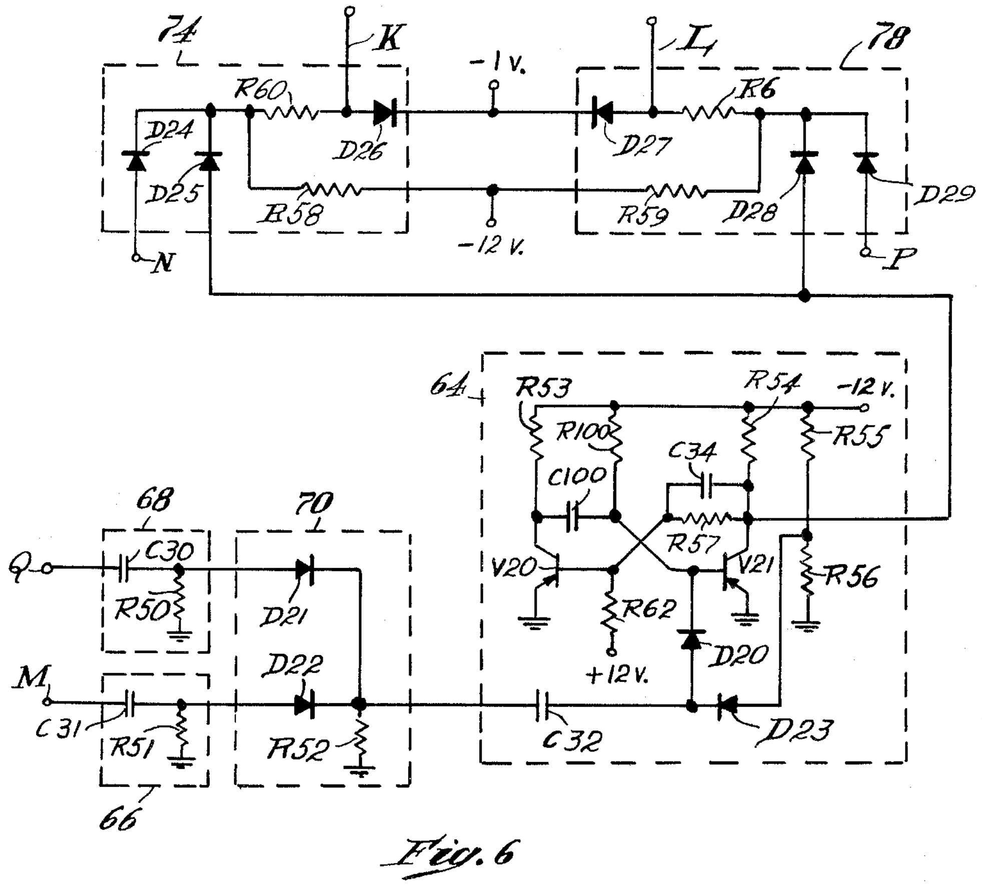
FIG. 6 is a circuit diagram of the gate timer according to FIG. 5.

The multivibrator circuits 60, 62 and 76 are essentially identical with the multivibrator circuit 64 as illustrated in FIG. 6 except for the pulse duration determining components R100 and C100. Appropriate values for these components to produce the other pulse durations needed are as follows:

For 1.2 m.-sec.; *R*100=43,000 ohms; *C*100=.047 $\mu$fd.
For 30 m.-sec.; *R*100=43,000 ohms; *C*100=1.0 $\mu$fd.

With these changes the multivibrator circuit shown included in FIG. 6 is repeated for each of the multivibrators indicated in FIG. 5 and the various units are interconnected directly as shown in FIG. 5.

While the embodiment according to FIGS. 2 to 6 is preferred at this time, modifications thereof have been found practical and two of these will now be described with reference to FIGS. 7 and 8. It should be understood that the component circuits of FIGS. 7 and 8 are essentially identical with, or essentially analogous to, those similarly labeled in FIG. 2, and that they operate to carry out the initially described method according to the invention.

Figure 7:
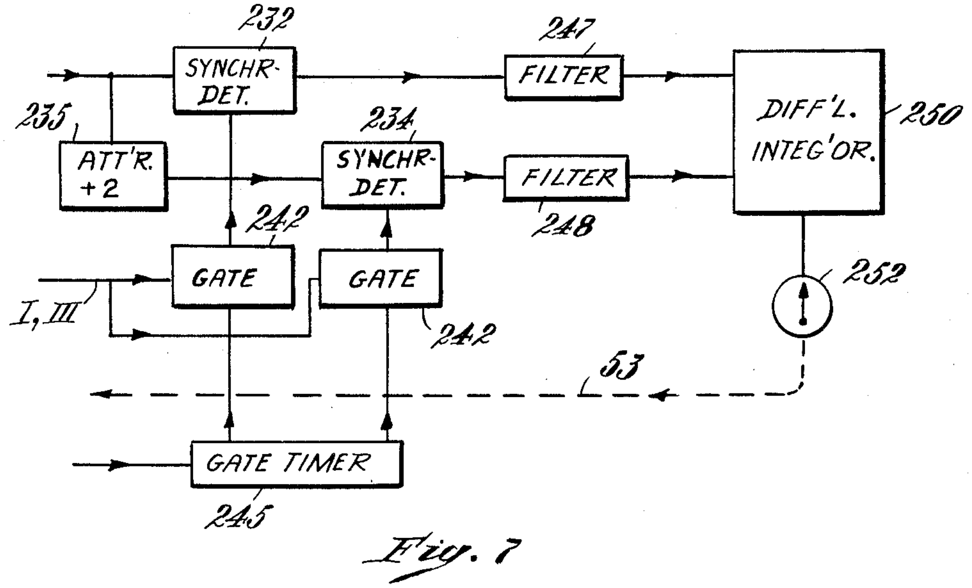
FIGS. 7 and 8 are block diagrams, similar to FIG. 2, of further embodiments of apparatus for carrying out the method according to the invention.

In FIG. 7 the gating, which times the taking of the amplitude samples, is applied to the input signal reference voltage into each of the synchronous detectors rather than to the output signals as in the previous example. Two synchronous detectors 232 and 234 are used as before with the received pulse wave signal being supplied to the detector 232 at full amplitude and to the detector 234 at half amplitude as supplied by the attenuator 235. The gate timer 245 and the gates 242 and 244 however operate to pass precisely timed bursts of the local wave signal provided by a local oscillator, as described with reference to section 10 and connections I and III of FIG. 2. Since the synchronous detectors 232 and 234 produce an output signal only when both, signal and reference voltages, of the respective input signals are applied, the output signals from these detectors 232, 234 are gated with the same timing as that which is applied by the timer 245 to the local wave signal. Accordingly the output signals from the synchronous detectors 232, 234 are identical with the signals passed by the gates 42 and 44, respectively, described above with reference to FIG. 2. These signals can thus be filtered as at 247 and 249 and their differential integrated at 250 as in that previous example. The resultant signal is indicated at 252 and used to correct the setting of the clock section as at 53 of FIGS. 2 and 7.

Figure 8:
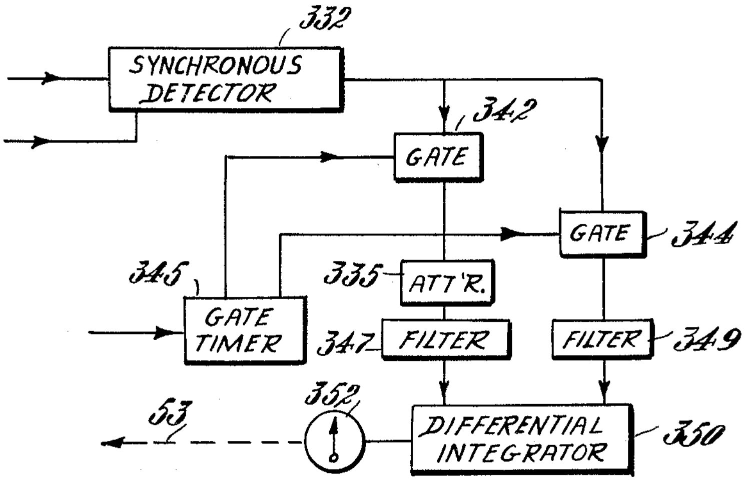

In the modification shown in FIG. 8 a single synchronous detector 332 is used to produce a single synchronously rectified signal whose amplitude is representative of the amplitude of the pulse wave then being received. This signal is supplied to both of the gates 342 and 344 with attenuation at 335 being applied after gating to the signal containing the full amplitude sample information passed by the gate 342. The two signal series defined by the gate, one attenuated, are filtered at 347 and 349 respectively and are then applied to a differential integrator 315 and utilized as in the previous example.

It will now be apparent that the herein described technique of establishing an instant of time within a received distorted wave form, definitely relating it to the undistorted transmitted wave form, can be used for purposes other than timing a local clock system, in combinations analogous to those herein described as examples of the use of this technique as a component within systems requiring exact correlation with a randomly distorted wave form.

It should be understood that the present disclosure is for the purpose of illustration only and that this invention includes all modifications and equivalents which fall within the scope of the appended claims.

We claim:

1. Apparatus for setting clocks under control of a transmitted electromagnetic wave modulated to carry a timing pulse signal of randomly distorted received form, comprising:

a local oscillator capable of being phase-locked to the frequency of a received pulse signal;

gating means timed by said oscillator to taking amplitude samples of the complete signal modulated wave at two different times within selected pulses;

means for averaging the amplitudes of the samples taken at each of said different times, respectively, over a considerable number of pulses; and means for adjusting said different gating times within the pulses of the sample taking while maintaining substantially constant the relative time spacing of said samples, such that said relative averaged amplitudes conform to a predetermined pattern;

whereby the gating time adjustment indicates the time of sample taking relative to the pulse timing, thereby providing a basis for clock setting.

2. Apparatus according to claim 1 wherein one of the samples is taken during the rise time of the received pulses.

3. Apparatus for setting clocks under control of a transmitted electromagnetic wave modulated to carry a timing pulse signal of known transmitted but randomly distorted received form, comprising:

a local oscillator capable of being phase-locked to the frequency of a received pulse signal;

gating means timed by said oscillator for taking amplitude samples of the complete signal modulated wave at least twice at different times within selected pulses;

means for averaging the amplitudes of each of the samples taken at each of said different times, respectively, over a considerable number of pulses; and means responsive to the relation of said averaged sample amplitudes, for adjusting the time, within the pulses, of the sample taking while maintaining substantially constant the relative, different, time spacing of said samples, such that said averaged amplitudes conform to a predetermined pattern;

whereby the adjustment of sample taking indicates the time of sample taking relative to the pulse timing, thereby providing a basis for clock setting.

4. Apparatus for setting clocks under control of a transmitted electromagnetic wave modulated to carry a timing pulse signal of known transmitted but randomly distorted received form, comprising:

a local oscillator capable of being phase-locked to the frequency of a received pulse signal;

synchronous detector means for combining the phase locked output of said oscillator and a received pulse signal and producing a signal which is proportional to the amplitude of the complete signal modulated wave at any given moment;

gating means for taking amplitude samples of said proportional signal at least twice at different times within each pulse;

means for averaging over a large number of pulses the amplitudes of the samples taken at the same time within the pulses; and means for adjusting said different times within the pulses, of the sample taking to conform the relative averaged amplitudes to a predetermined pattern;

whereby the time of sample taking which produces conformity to the predetermined pattern indicates time relative to the timing of the transmitted pulse.

5. Apparatus for setting clocks under control of a transmitted electromagnetic wave modulated to carry a timing pulse signal of known transmitted but randomly distorted received form and period, comprising:

a local oscillator phase-locked to the frequency of a received pulse signal;

synchronous detector means for combining the output of said local oscillator and the received pulse signal and producing a pulse envelope signal for each received complete signal modulated wave pulse;

gating means timed by said oscillator for taking amplitude samples of said envelope signal at least twice at different times within each pulse interval;

means for averaging the amplitudes of each sample at corresponding times, respectively, within a large number of sampled pulses; and means for adjusting the time, within the pulse intervals, of the sample taking to conform the relative averaged amplitudes to a predetermined pattern;

whereby the time of sample taking which produces conformity to the predetermined pattern indicates time relative to the timing of the transmitted pulse.

6. Apparatus for setting clocks under control of a transmitted electromagnetic wave carrying a timing pulse signal of known transmitted but randomly distorted received form and period, comprising:

local oscillator means providing an output signal whose frequency is phase-locked to the carrier frequency of the received pulse signal;

first synchronous detector means for combining the output of said oscillator and the received pulse signal and producing a signal which is proportional in amplitude to the received signal at any given moment;

gating means, timed by said oscillator means, for passing a first amplitude sample of said proportional signal during the rise time of received pulses;

attenuator means for halving the amplitude of the pulse signal applied to said first synchronous detector means;

second synchronous detector means for combining said halved amplitude pulse signal and the output of said oscillator, thus producing a signal which is similar to but one-half the amplitude of said proportional signal;

gating means, timed by said oscillator means, for passing a second amplitude sample of said half amplitude proportional signal during the full amplitude portion of received pulses; and differential integrator means for providing an indication signal which is representative of the difference between the average value of said first samples and the average value of said second samples;

whereby the time of sample taking which produces conformity to the predetermined pattern indicates time relative to the timing of the transmitted pulse.

7. A timing system for setting clocks under control of transmitted pulses of precisely determined frequency at precisely determined intervals, comprising:

a receiver for said waves including a local oscillator capable of being phase-locked to the frequency of said sender;

a clock means driven in synchronism with said local oscillator;

a gating circuit timed by said clock means for sampling the amplitudes of the complete pulses at various times within selected pulses;

means for averaging the amplitudes of each of the samples taken at each of said various times, respectively, over a considerable number of pulses; and means for setting said clock means to a predetermined pattern of said averaged amplitudes;

whereby the pattern of averaged samples can be chosen for accurately synchronized setting of the clock with respect to the interval determining means at the sender.

8. Apparatus for setting clocks under control of a transmitted electromagnetic wave modulated to carry a timing pulse signal of known transmitted but randomly distorted received form, comprising:

a stable local oscillator operating substantially at the frequency of said received pulse signal;

a phase shifter for altering the phase of the output signal of said oscillator;

two synchronous detectors for combining the phase-altered output of said oscillator and a received complete modulated wave pulse signal, producing two signals proportional to the amplitude of the received pulse signal at any given moment;

servo means for controlling said phase shifter to minimize the phase difference between the phase-altered oscillator output and the received pulse signal;

gating means for taking amplitude samples of said proportional signals at least twice within each sampled pulse;

means for averaging the amplitude of each of the samples taken at the same time within a sample over a large number of pulses; and means for adjusting the time within the pulses of the sample taking, to conform the relative averaged amplitudes to a predetermined pattern;

whereby the time of sample taking which produces conformity to the predetermined pattern indicates time locally relative to the timing of the transmitted pulse.

9. Method for setting clocks under control of a transmitted electromagnetic wave modulated to carry a timing pulse signal of known transmitted but randomly distorted received form and period, comprising the steps of:

taking at least two series of samples of the amplitude of the complete signal modulated wave, with the samples of the respective series at different corresponding times, determined by a locally generated wave, within an appreciable number of selected signal periods;

locking said locally generated wave to said transmitted wave;

averaging the amplitudes of the samples of respective series; and relating said locally generated wave to said transmitted pulses as timed by the conformity of the averaged sample amplitudes to a predetermined pattern;

whereby the local clock can be accurately set to the received timing pulses regardless of their random distortion.

References Cited by the Examiner

UNITED STATES PATENTS

| | | | |
|---|---|---|---|
| 2,516,356 | 7/50 | Tull et al. | 328—127 |
| 2,794,979 | 6/57 | Palmer | 328—63 |
| 2,824,218 | 2/58 | Gillihand | 325—87 |
| 2,858,425 | 10/58 | Gordon | 328—134 |
| 2,914,674 | 11/59 | Barry | 331—14 |
| 3,078,344 | 2/63 | Crafts et al. | 328—72 |

DAVID G. REDINBAUGH, *Primary Examiner.*